(No Model.)
D. S. FULLER.
GOOSE CALL.
No. 333,094. Patented Dec. 22, 1885.
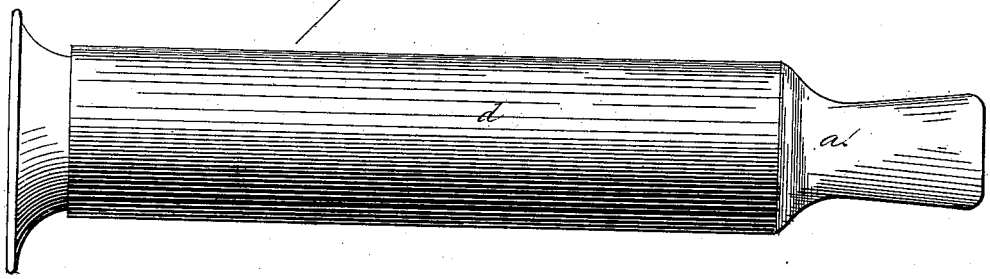
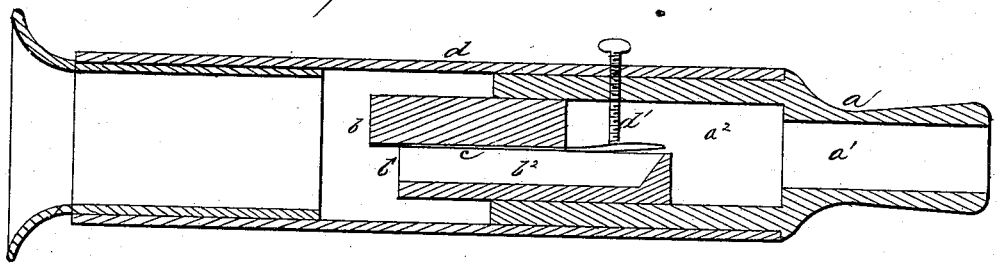
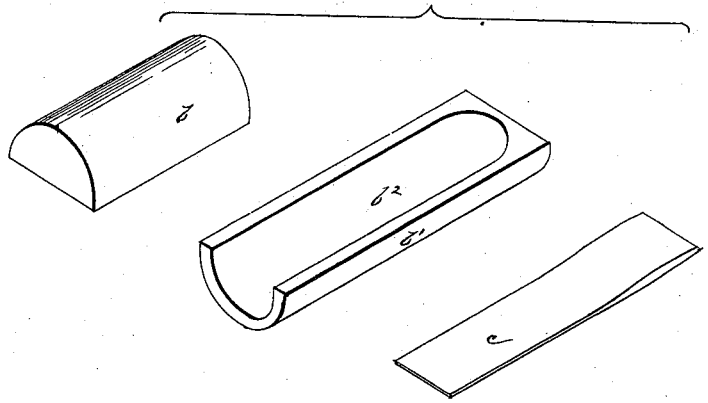
Witnesses:
N. C. McArthur
Frank Stratton
Inventor.
David S. Fuller
per
H. Harrison
Attorney.

UNITED STATES PATENT OFFICE.

DAVID S. FULLER, OF CHICAGO, ILLINOIS, ASSIGNOR OF ONE-HALF TO WATTS DE GOLYER, OF SAME PLACE.

GOOSE-CALL.

SPECIFICATION forming part of Letters Patent No. 333,094, dated December 22, 1885.

Application filed June 15, 1885. Serial No. 168,730. (No model.)

*To all whom it may concern:*

Be it known that I, DAVID S. FULLER, a citizen of the United States, residing at Chicago, in the county of Cook and State of Illinois, have invented certain new and useful Improvements in Goose-Calls, of which the following is a specification, to wit:

This invention relates to goose-calls; and it consists in certain novel details of the construction and arrangement of the same, substantially as will be hereinafter more fully set forth and claimed.

In order to enable others skilled in the art to which my invention appertains to make and use the same, I will now proceed to describe its construction and operation, referring to the accompanying drawings, in which—

Figure 1 is a side elevation; Fig. 2, a longitudinal section of my device; and Fig. 3 represents a perspective view of the reed and its holder separated.

$a$ represents the mouth-piece of my call, which is outwardly of any shape most convenient or desirable, and formed with a central opening or passage, $a'$, the rear end of which is enlarged to form a chamber, $a^2$, in which the reed is secured.

$b$ $b'$ represent two blocks, one of which projects considerably nearer the forward end of the call than the other, and is hollowed out from its rear nearly to its forward end, as at $b^2$. Between these blocks is held the reed $c$, which is double or formed of two leaves, one of which is thinner or of a different tone from the other. The rear end of the reed is firmly held, as described, while its forward end is free and lies over the hollowed portion of the under clamping-block, $b'$, as fully seen in Fig. 2. The forward ends of the leaves forming the reed are also slightly bent up at their points to admit the air freely beneath them, and the upper leaf is also slightly convexed just in rear of its point to give air access and aid the independent vibration of the two. The reed and blocks being firmly driven into the rear end of the mouth-piece are securely held in place, and prevent any escape of air except through the reed and hollowed block.

The rear end of the mouth-piece is inserted in a tube or horn, $d$, to intensify the sound, and this is preferably made in two pieces, which telescope together, and may be drawn in or out, as required, to change the tone of the call as desired. A regulating-screw, $d'$, also projects through the side of the call, and is used to adjust the vibrating ends of the reed-leaves to the desired tone.

The use of the device is as a goose-call for hunters and similar objects; and the reed, being made of two leaves differently toned, gives two sounds, which, when the reed is properly placed in a horn or cylindrical body of resonant material, gives an exact reproduction of the call of a goose, and which is readily changed to imitate either the male or female, as desired, by the adjusting-screw.

I am aware that it is not new, broadly, to confine a reed between the two parts of its holder, and do not desire to claim such as my invention.

Having thus fully described my invention, what I claim as new, and desire to secure by Letters Patent, is—

1. A mouth-piece formed with a chambered rear end, in combination with a reed formed of two differently-toned leaves secured in said chamber, substantially as and for the purpose set forth.

2. In a goose-call, a mouth-piece having its rear end chambered out, in combination with two blocks in its rear end, one of which is hollowed from the rear nearly to its forward end, and a two-leaved reed clamped at one end between said blocks and at the other end lying free over the hollow, substantially as and for the purpose set forth.

3. In a goose-call, the reed $c$, formed of two leaves, one of which is thinner or differently-toned from the other, substantially as and for the purpose set forth.

4. In a goose-call, a reed formed of two differently-toned leaves, the forward ends of which are slightly bent upward, substantially as and for the purpose set forth.

5. In a goose-call, a reed formed of two differently-toned leaves having their free ends slightly convexed in rear of their points to give free access of air between them, substantially as and for the purpose set forth.

6. In a goose-call, a main body provided with a reed formed of two differently-toned leaves, one of which is convexed in rear of its point, in combination with an adjusting-screw having its point bearing upon said convex leaf, substantially as and for the purpose set forth.

In testimony whereof I affix my signature in presence of two witnesses.

DAVID S. FULLER.

Witnesses:
W. C. McARTHUR,
FRANK STRATTON.